(12) United States Patent
Ursell et al.

(10) Patent No.: US 10,704,882 B2
(45) Date of Patent: Jul. 7, 2020

(54) MULTIFUNCTION STRAIGHT EDGE GUIDE

(71) Applicant: Affinity Tool Works, LLC, Troy, MI (US)

(72) Inventors: Mike Ursell, Bloomfield Hills, MI (US); Garry Favel, Kibbutz Kadarim (IL); Tsvi Hershkovich, Karmiel (IL)

(73) Assignee: AFFINITY TOOL WORKS, LLC, Troy, MI (US)

( * ) Notice: Subject to any disclaimer, the term of this patent is extended or adjusted under 35 U.S.C. 154(b) by 217 days.

(21) Appl. No.: 15/851,614

(22) Filed: Dec. 21, 2017

(65) Prior Publication Data

US 2018/0180394 A1 Jun. 28, 2018

Related U.S. Application Data

(60) Provisional application No. 62/438,117, filed on Dec. 22, 2016.

(51) Int. Cl.
  *G01B 3/04* (2006.01)
  *B27B 9/04* (2006.01)
  *B25H 7/02* (2006.01)

(52) U.S. Cl.
  CPC ............... *G01B 3/04* (2013.01); *B25H 7/02* (2013.01); *B27B 9/04* (2013.01)

(58) Field of Classification Search
  CPC .................................... G01B 3/56; G01B 3/04
  USPC ................................................... 33/430, 482
  See application file for complete search history.

(56) References Cited

U.S. PATENT DOCUMENTS

| | | | | |
|---|---|---|---|---|
| 3,089,245 A | * | 5/1963 | Cromer | B43L 7/005 33/342 |
| 4,494,434 A | * | 1/1985 | Young | B23Q 9/005 33/479 |
| 4,598,482 A | * | 7/1986 | Castleton | B25H 7/02 144/144.51 |
| 4,607,434 A | * | 8/1986 | Francis | B23Q 17/2233 33/373 |
| 4,819,338 A | * | 4/1989 | Lategan | B43L 5/02 33/437 |
| 4,974,330 A | * | 12/1990 | Covert | B43L 7/0275 33/474 |
| 5,016,509 A | * | 5/1991 | Stottman | B27B 25/10 294/15 |
| 5,182,975 A | * | 2/1993 | Warner | B23Q 9/0042 33/479 |
| 5,349,758 A | * | 9/1994 | Bear | B25H 7/00 33/194 |
| 6,256,899 B1 | * | 7/2001 | McGhee | B23Q 9/0042 33/628 |

(Continued)

*Primary Examiner* — Yaritza Guadalupe-McCall
(74) *Attorney, Agent, or Firm* — William H. Honaker; Dickinson Wright PLLC

(57) ABSTRACT

A multifunction straight edge guide having a handle and a straight edge. The handle has a plurality of perimeter surfaces and the straight edge has a mating edge to mate with one of the perimeter surfaces to interconnect the handle and the straight edge. The handle has three sections, two outer sections and a central support ledge. The outer sections define sidewalls which are generally perpendicular to the support ledge so that the straight edge guide can be used with either the left or right hand by turning the straight edge guide over. Each of the plurality of perimeter surfaces are angled with respect to the sidewalls.

20 Claims, 2 Drawing Sheets

(56) References Cited

U.S. PATENT DOCUMENTS

| | | | | |
|---|---|---|---|---|
| 6,341,427 B1* | 1/2002 | Tepley | ............... | B27F 7/00 33/194 |
| 6,904,689 B2* | 6/2005 | Sugita | ............... | B27F 1/00 33/427 |
| 6,918,189 B1* | 7/2005 | McBrayer | ............ | B25H 7/00 33/1 G |
| 7,305,773 B2* | 12/2007 | Hios | ............... | B43L 7/10 33/429 |
| 7,861,428 B1* | 1/2011 | Clark | ............... | B27B 25/10 33/42 |
| 2018/0180394 A1* | 6/2018 | Ursell | ............... | B25H 7/02 |

* cited by examiner

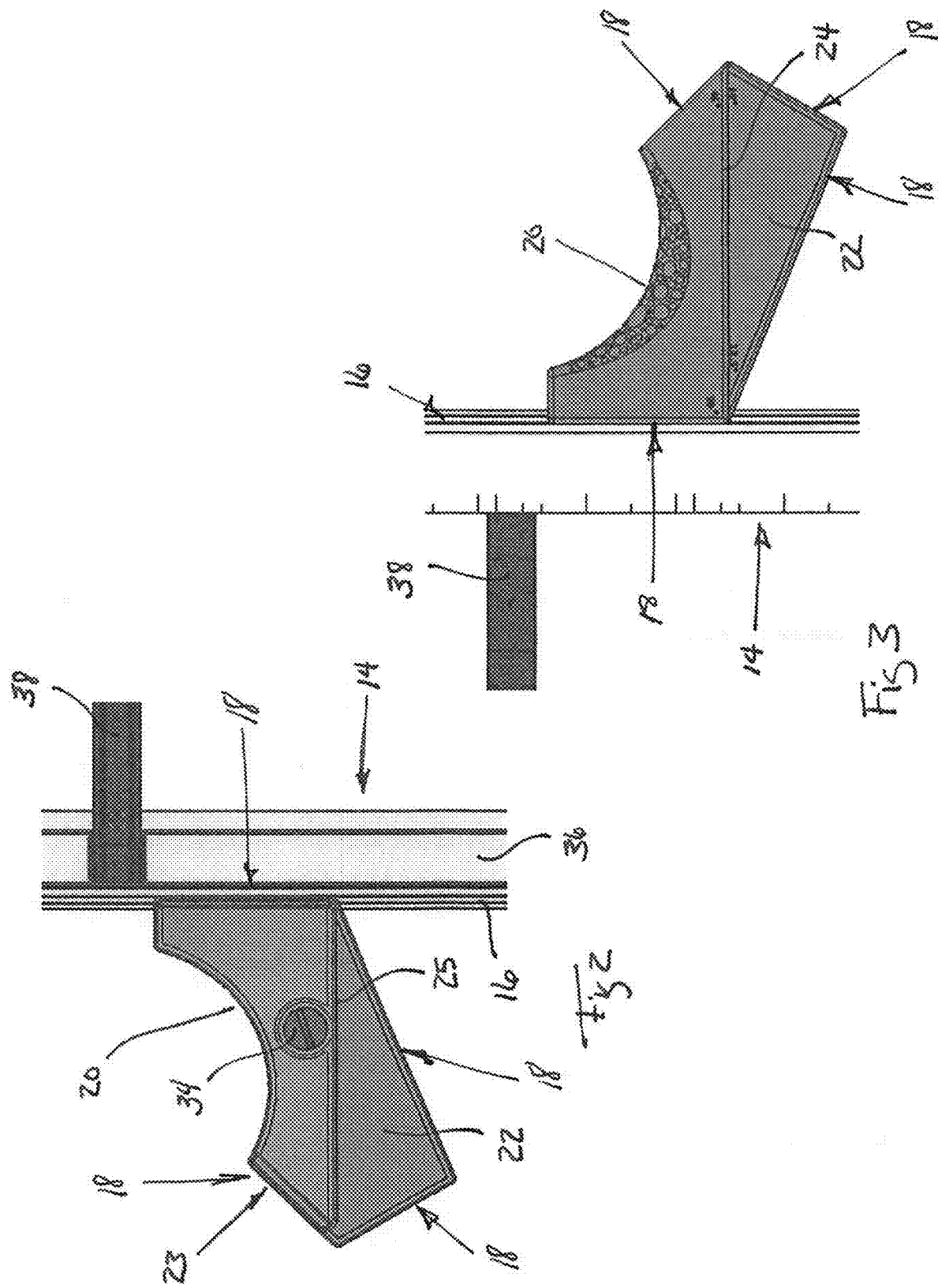

MULTIFUNCTION STRAIGHT EDGE GUIDE

CROSS REFERENCE TO RELATED APPLICATION

This application claims the benefit of U.S. Provisional Application Ser. No. 62/438,117, filed Dec. 22, 2016, which is incorporated herein by reference in its entirety.

TECHNICAL FIELD

This invention relates generally to wood working tools and more particularly to a straight edge to guide tools along a straight line.

BACKGROUND OF THE INVENTION

Straight edge guides are well known in the wood working industry. Known straight edge guides typically have a straight edge upon which a circular saw, router, etc. can be guided. The straight edge is clamped to the workpiece and the edge of the saw is guided along it. Various clamping methods are used. Examples of clamping methods are separate c-type clamps, a clamp mechanism built into the straight edge, or a t-square type guide that is attached to the straight edge.

Although each of these is good for their intended purpose, they have drawbacks. The main drawback is that they are not versatile. They are limited in their applications. Most known straight edge guides are intended to cut a straight cut generally parallel to the edge of the workpiece. These cannot be used to make straight cuts. Those that can be used to make a cut at an angle to the edge of the workpiece require a fair amount of set up. This is time consuming and requires a fair amount of care to properly set the correct angle.

What is needed is a multifunction straight edge guide that can be easily and quickly positioned to make cuts at various angles.

SUMMARY OF THE INVENTION

The present invention is a multifunction straight edge guide that allows a user to make cuts quickly at various angles. The multifunction straight edge guide has a handle with a plurality of perimeter surfaces. The straight edge has a mating edge to mate with one of the perimeter surfaces to interconnect the handle and the straight edge.

The handle has three sections, two outer sections and a central support ledge. The outer sections define sidewalls which are generally perpendicular to said support ledge, so that said straight edge guide can be used with either the left or right hand by turning said straight edge guide over.

Each of the plurality of perimeter surfaces is angled with respect to the sidewalls. The perimeter surfaces are angled at 90°, 45°, 27.5°, and 13.75° respectively with respect to said side walls.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a partial bottom view of the Multifunction Straight Edge Guide of the present invention.

FIG. 3 is a partial top view of the Multifunction Straight Edge Guide of the present invention.

DESCRIPTION OF THE ENABLING EMBODIMENT

Figure 1:
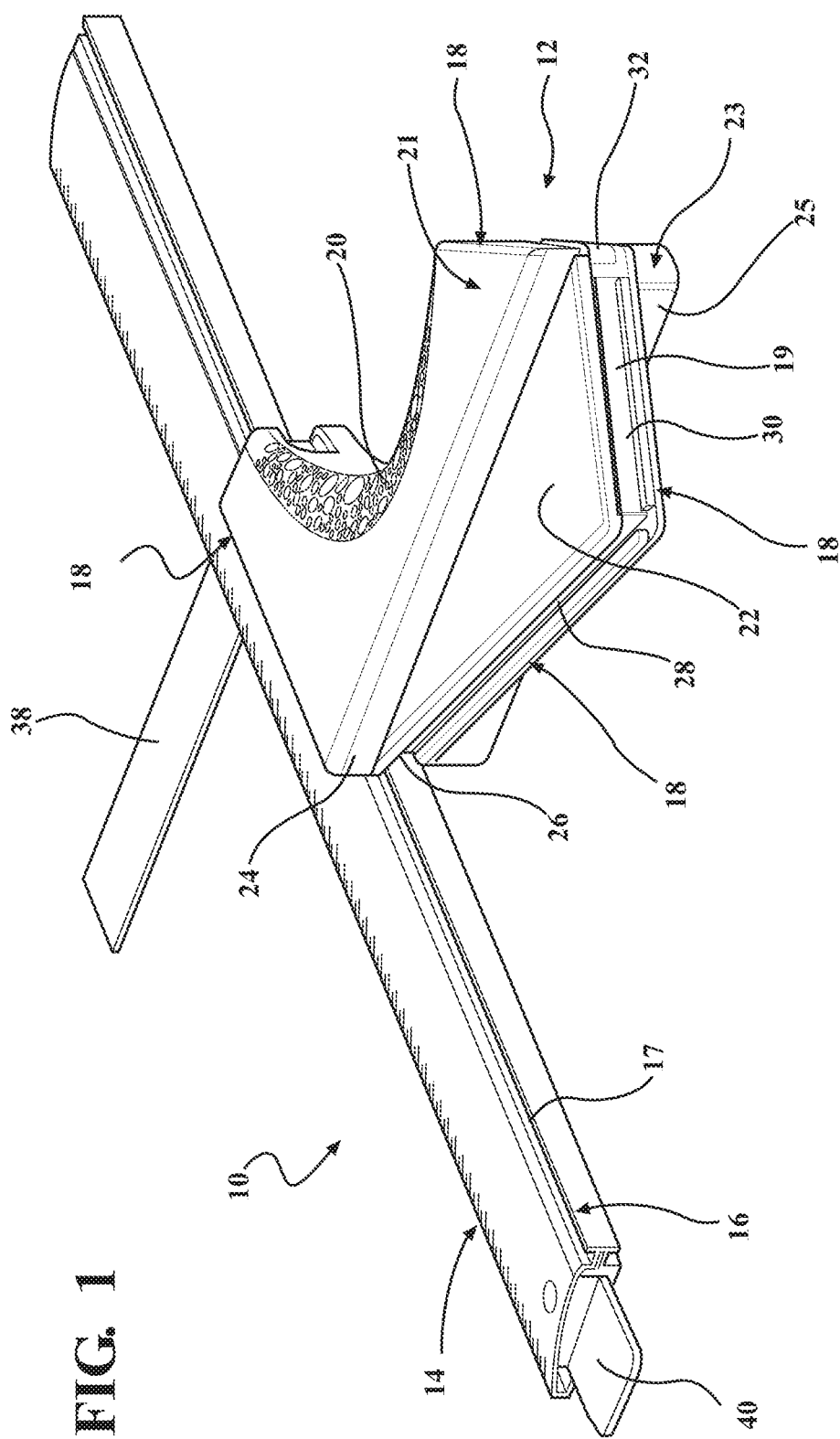
FIG. 1 is a perspective view of the Multifunction Straight Edge Guide of the present invention.

The multifunction straight edge guide of the present invention is shown generally at 10 in FIGS. 1 through 3. The multifunction straight edge guide 10 of the present invention has a handle 12 connected to a straight edge 14. The handle 12 has a plurality of perimeter surfaces 18 and straight edge 14 has a mating edge 16. The surfaces 18 and mating edge 16 have mating tracks 17 and grooves 19 so that the two can be interconnected, can slide with respect to one another and can be locked with respect to one another. It should be appreciated by one of ordinary skill in the art that the grooves 19 could be on the straight edge 14 and the tracks 17 on the handle 12 or the grooves 19 on the handle 12 and the tracks 17 on the straight edge 14.

The handle 12 as disclosed has three sections, two outer sections 21 and 23 and a central support ledge 22. A hand grip 20 is formed on one side of the handle 12, which as illustrated is curved to facilitate the palm of the user's hand. It should be appreciated that other shapes would also be available, for example, straight, curved outwardly, etc. Also as illustrated, the hand grip 20 is textured to provide a better grip. Opposite the hand grip 20 is the support ledge 22 and sidewalls 24 and 25. The support ledge 22 is adapted to rest upon the workpiece and one of the two sidewalls 24 or 25 is adapted to engage the edge of the workpiece. The two sidewalls 24 and 25 allow the multifunction straight edge guide 10 of the present invention to be used either with the left hand or the right hand by merely turning the guide 10 over.

As illustrated, there are four perimeter surfaces 18, separately identified as 26, 28, 30, and 32 angled with respect to the sidewalls 24 and 25. The surface 26 is angled at 90° to sidewalls 24 and 25; the surface 28 is angled at 45° to sidewalls 24 and 25; the surface 30 is angled at 27.5° to sidewalls 24 and 25; and the surface 32 is angled at 13.75° to sidewalls 24 and 25.

As shown in FIG. 2, a knob 34 is provided to tighten the outer sections 21 and 23 and clamp the respective groove 18 to the track. In the disclosed embodiment, the knob 34 is threaded onto a threaded shaft, which is not shown, that extends from section 21 through ledge 22 and through section 23.

As illustrated in FIG. 2, the bottom of the straight edge 14 has a channel 36 extending along its length. In the disclosed embodiment, a saw blade locator 38 is mounted in the channel 36. The locator 38 extends outwardly at a right angle from the straight edge 14. The locator 38 locates the saw blade location with respect to the straight edge 14. When first used, the saw is positioned against the straight edge 14 and cut across the locator which then locates the saw every time at that distance from the straight edge 14. If a different saw is used, another locator 38 can be inserted in to the channel 36 to locate that saw blade.

In the disclosed embodiment, the length of the straight edge 14 can be extended by adding additional sections to the straight edge. The connector 40 extending from the end of the straight edge 14 can be inserted into the channel 36 of an adjoining edge 14 making the straight edge longer. Additional sections 14 can be added to make the straight edge as long as desired.

To use the multifunction straight edge guide 10 with the straight edge 14, the optional step of locating the saw blade, of for example a circular saw, with respect to the straight edge 14 is done first. Once located, it will be known for any future uses of that particular saw. To determine the saw blade location, the locator 38 is mounted in the channel 36. The handle 12 is mounted to the straight edge 14 through the surface 26 mounted to the track 16. The sidewall 24 or 25 is positioned against the edge of a sacrificial work piece. The saw shoe is then placed against the straight edge 14 and the saw is energized and the saw blade cuts through the locator 38.

The multifunction straight edge guide 10 can be used to make cuts at various angles, i.e. 90°, 45°, 27.5° and 13.75°. The desired angle cut is made by attaching the handle 12 through the respective groove 26, 28, 30 or 32 to track 16. Once attached, the knob 34 can be tightened to lock the handle to the straight edge 14. The sidewall 24 or 25, depending upon left or right handed operation, is positioned against the edge of the workpiece. The support ledge 22 will rest upon the workpiece to add stability. The user pushes against the grip 20 and the saw shoe is placed against the straight edge 14 and the cut is made. The locator 38 is used to ensure that the cut is made at the correct location.

Additionally, a straight cut of 180° can also be made by using the groove 26 attached to the mating edge 16. To make a straight cut, the inner edge of the handle 12 is positioned against the work piece edge instead of the sidewalls 24 or 25.

As discussed above, if the length of the cut exceeds the length of the straight edge 14, additional straight edge lengths 14 can be added.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A multifunction straight edge guide comprising:
   a handle and a straight edge, said handle having a plurality of perimeter surfaces and said straight edge having a mating edge to mate with one of said perimeter surfaces to interconnect said handle and said straight edge;
   said handle has three sections, two outer sections and a central support ledge, said outer sections defining sidewalls which are generally perpendicular to said support ledge, whereby said straight edge guide can be used with either the left or right hand by turning said straight edge guide over;
   each of said plurality of perimeter surfaces are angled with respect to said sidewalls;
   said straight edge has a channel extending along its length.

2. The multifunction straight edge guide of claim 1, wherein said perimeter surfaces and said mating edge respectfully include either a track or groove, said track being slideably received within said groove.

3. The multifunction straight edge guide of claim 2, wherein said mating edge includes a track and said perimeter surfaces include a grove.

4. The multifunction straight edge guide of claim 2, wherein said mating edge includes a groove and said perimeter surfaces include a track.

5. The multifunction straight edge guide of claim 1, wherein said handle includes a handgrip.

6. The multifunction straight edge guide of claim 1, wherein said three sections are separate pieces with said support ledge sandwiched between said two outer sections.

7. The multifunction straight edge guide of claim 1, further including a locking mechanism to lock said handle with respect to said straight edge.

8. The multifunction straight edge guide of claim 7, wherein said locking mechanism squeezes said two outer sections against said support ledge.

9. The multifunction straight edge guide of claim 1, wherein said locking mechanism includes a rotatable control.

10. The multifunction straight edge guide of claim 1, wherein said perimeter surfaces are at different angles with respect to said sidewalls.

11. The multifunction straight edge guide of claim 10, wherein said perimeter surfaces are at 90°, 45°, 27.5°, and 13.75° respectively with respect to said side walls.

12. The multifunction straight edge guide of claim 1, wherein said straight edge has a channel extending along its length.

13. The multifunction straight edge guide of claim 12, further including a saw blade locator.

14. The multifunction straight edge guide of claim 12, further including a saw blade locator positioned within said channel.

15. The multifunction straight edge guide of claim 1, further includes inserts, said inserts being inserted into said channel to interconnect said straight edge with additional straight edge sections to increase the overall length of said straight edge guide.

16. A multifunction straight edge guide comprising:
    a handle and a straight edge, said handle having a plurality of perimeter surfaces and said straight edge having a mating edge to mate with one of said perimeter surfaces to interconnect said handle and said straight edge;
    said handle has three sections, two outer sections and a central support ledge, said outer sections defining sidewalls which are generally perpendicular to said support ledge, whereby said straight edge guide can be used with either the left or right hand by turning said straight edge guide over;
    each of said plurality of perimeter surfaces are angled with respect to said sidewalls, said perimeter surfaces are angled at 90°, 45°, 27.5°, and 13.75° respectively with respect to said side walls.

17. The multifunction straight edge guide of claim 16, wherein said perimeter surfaces and said mating edge respectfully include either a track or groove, said track being slideably received within said groove.

18. The multifunction straight edge guide of claim 16, wherein said three sections are separate pieces with said support ledge sandwiched between said two outer sections.

19. The multifunction straight edge guide of claim 18, wherein said locking mechanism squeezes said two outer sections against said support ledge.

20. The multifunction straight edge guide of claim 16, further including a locking mechanism to lock said handle with respect to said straight edge.

* * * * *